(12) United States Patent
Tanaka

(10) Patent No.: US 10,306,177 B2
(45) Date of Patent: May 28, 2019

(54) TELEVISION STAND AND ELECTRONIC APPARATUS

(75) Inventor: Takafumi Tanaka, Tokyo (JP)

(73) Assignee: TOSHIBA VISUAL SOLUTIONS CORPORATION, Misawa-Shi, Aomori (JP)

( * ) Notice: Subject to any disclaimer, the term of this patent is extended or adjusted under 35 U.S.C. 154(b) by 1055 days.

(21) Appl. No.: 13/271,977

(22) Filed: Oct. 12, 2011

(65) Prior Publication Data

US 2012/0212685 A1 Aug. 23, 2012

(30) Foreign Application Priority Data

Feb. 21, 2011 (JP) ................................. 2011-034645

(51) Int. Cl.
*H04N 5/64* (2006.01)
(52) U.S. Cl.
CPC ...................................... *H04N 5/64* (2013.01)
(58) Field of Classification Search
USPC ......... 248/121, 125.8, 126, 157, 176.3, 593, 248/595, 598, 617, 125.7, 125.9, 188.1, 248/188.2, 346.01, 903, 917, 919, 924, 248/74.2; 348/836, 843, E5.132, E5.128, 348/E5.131
See application file for complete search history.

(56) References Cited

U.S. PATENT DOCUMENTS

| | | |
|---|---|---|
| D291,564 S | 8/1987 | Kajita |
| 4,759,205 A | 7/1988 | Kuwano et al. |
| 4,843,855 A | 7/1989 | Kuwano et al. |
| 4,853,648 A | 8/1989 | Imanshi |
| 5,086,384 A | 2/1992 | Fukada |
| 5,111,361 A | 5/1992 | Kobayashi |
| D358,144 S | 5/1995 | Masaaki |
| 5,664,090 A | 9/1997 | Seki et al. |

(Continued)

FOREIGN PATENT DOCUMENTS

| | | |
|---|---|---|
| JP | 06350261 A | 12/1994 |
| JP | 2007-086647 | 4/2007 |

(Continued)

OTHER PUBLICATIONS

Machine translation of JP 2007-086647 A.*

(Continued)

*Primary Examiner* — Behrooz M Senfi
*Assistant Examiner* — Ana Picon-Feliciano
(74) *Attorney, Agent, or Firm* — Knobbe, Martens, Olson & Bear, LLP

(57) ABSTRACT

According to one embodiment, an electronic apparatus includes a display, a support part which supports the display, and an opposed part which is opposed to at least part of the support part at a side opposite to the display. The electronic apparatus also includes a rotator which includes a first end part and a second end part that is located opposite to the first end part. The rotator is rotatable between a first position where the second end part is positioned between the support part and the opposed part and a second position which is different from the first position. The electronic apparatus also includes a control part which abuts against the rotator that is located in the first position and is capable of stopping rotation of the rotator.

10 Claims, 11 Drawing Sheets

(56) References Cited

U.S. PATENT DOCUMENTS

| | | | |
|---|---|---|---|
| D396,223 S | 7/1998 | Brunner et al. | |
| D405,435 S | 2/1999 | Brunner et al. | |
| D407,713 S | 4/1999 | Brunner | |
| 5,934,774 A | 8/1999 | Wu et al. | |
| 6,392,873 B1 | 5/2002 | Honda | |
| D458,622 S | 6/2002 | Nagase | |
| 6,429,725 B1 | 8/2002 | Tanzawa et al. | |
| D464,981 S | 10/2002 | Nagase | |
| D472,900 S | 4/2003 | Matsumoto | |
| D562,811 S | 2/2008 | Asanuma et al. | |
| 7,614,596 B2 | 11/2009 | Takao | |
| D611,275 S | 3/2010 | Shimizu | |
| 7,671,934 B2 | 3/2010 | Miyayama | |
| 7,690,617 B2 | 4/2010 | Takao | |
| D693,607 S | 11/2013 | Johnson et al. | |
| 8,593,796 B2 | 11/2013 | Takao | |
| 8,773,850 B2 | 7/2014 | Minaguchi et al. | |
| D711,870 S | 8/2014 | Johnson et al. | |
| D712,396 S | 9/2014 | Johnson et al. | |
| 2002/0084396 A1* | 7/2002 | Weaver | F16M 11/10 248/278.1 |
| 2002/0166940 A1* | 11/2002 | Barkan | F16M 13/00 248/551 |
| 2004/0113031 A1* | 6/2004 | Sung | F16M 11/04 248/146 |
| 2006/0243879 A1* | 11/2006 | Chiu | F16M 11/00 248/454 |
| 2007/0018062 A1* | 1/2007 | Calinescu | 248/220.21 |
| 2007/0139871 A1* | 6/2007 | Chiu | F16M 11/00 361/679.22 |
| 2008/0028613 A1 | 2/2008 | Takao | |
| 2008/0042031 A1* | 2/2008 | Chang | F16M 11/16 248/274.1 |
| 2009/0026332 A1 | 1/2009 | Yoshida et al. | |
| 2009/0121097 A1 | 5/2009 | Takao | |
| 2009/0122219 A1 | 5/2009 | Miyayama | |
| 2009/0266946 A1* | 10/2009 | Shimizu | F16M 11/10 248/157 |
| 2009/0302175 A1* | 12/2009 | Torii | F16M 11/10 248/122.1 |
| 2010/0276562 A1* | 11/2010 | Nguyen | H04N 5/655 248/488 |
| 2011/0101185 A1* | 5/2011 | Kitaguchi | F16M 11/048 248/222.14 |
| 2011/0170257 A1* | 7/2011 | Allen | E05B 73/0082 361/679.57 |
| 2011/0204199 A1 | 8/2011 | Sekino | |
| 2013/0058065 A1 | 3/2013 | Minaguchi et al. | |
| 2013/0083255 A1 | 4/2013 | Hlratomo et al. | |
| 2013/0107136 A1 | 5/2013 | Tamura et al. | |
| 2014/0185262 A1 | 7/2014 | Hashimoto et al. | |
| 2014/0211108 A1 | 7/2014 | Matsumoto et al. | |
| 2014/0355196 A1 | 12/2014 | Hashimoto et al. | |
| 2014/0355210 A1 | 12/2014 | Hashimoto et al. | |

FOREIGN PATENT DOCUMENTS

| | | | |
|---|---|---|---|
| JP | 2007086647 A | * | 4/2007 |
| JP | 2008-048780 | | 3/2008 |
| JP | 2008-160236 | | 7/2008 |
| JP | 2008160236 A | * | 7/2008 |
| JP | 2008160236 A | * | 7/2008 |

OTHER PUBLICATIONS

Machine translation of JP 2008160236 A.*
Japanese Patent Application No. 2011-034645, First Office Action, dated Feb. 21, 2012, (with English Translation).

* cited by examiner

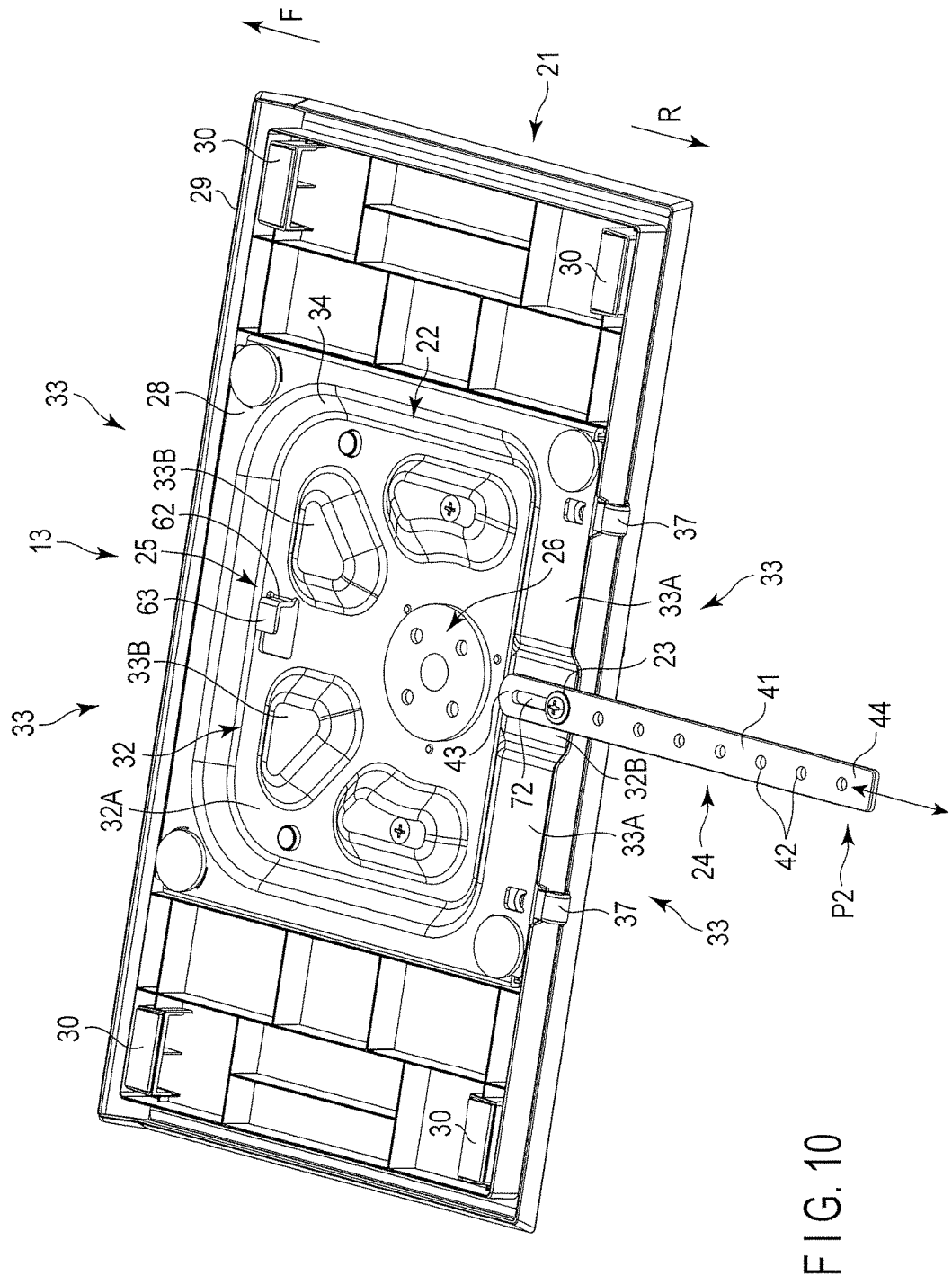
F I G. 10

TELEVISION STAND AND ELECTRONIC APPARATUS

CROSS-REFERENCE TO RELATED APPLICATIONS

This application is based upon and claims the benefit of priority from prior Japanese Patent Application No. 2011-034645, filed Feb. 21, 2011, the entire contents of which are incorporated herein by reference.

FIELD

Embodiments described herein relate generally to a television stand and an electronic apparatus, which supports a display module.

BACKGROUND

To prevent a television or the like from falling down, there are falling-preventing bands to fix the television on a television rack or the like. It is expected that providing a television with such a band takes on increasing importance, as televisions increase in size in the future.

For use in television racks of various shapes, the band is required to have a sufficient length. On the other hand, such a long band may be a nuisance, and there have been demands for improvement of the bands with respect to their ease of use.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 10 is an exemplary perspective view of a stand of a television which is an example of an electronic apparatus according to a third embodiment, as viewed from below.

DETAILED DESCRIPTION

Various embodiments will be described hereinafter with reference to the accompanying drawings.

In general, according to one embodiment, an electronic apparatus includes a display, a support part which supports the display, and an opposed part which is opposed to at least part of the support part at a side opposite to the display. The electronic apparatus also includes a rotator which includes a first end part and a second end part that is located opposite to the first end part. The rotator is rotatable between a first position where the second end part is positioned between the support part and the opposed part and a second position which is different from the first position. The electronic apparatus also includes a control part which abuts against the rotator that is located in the first position and is capable of stopping rotation of the rotator.

Figure 1:
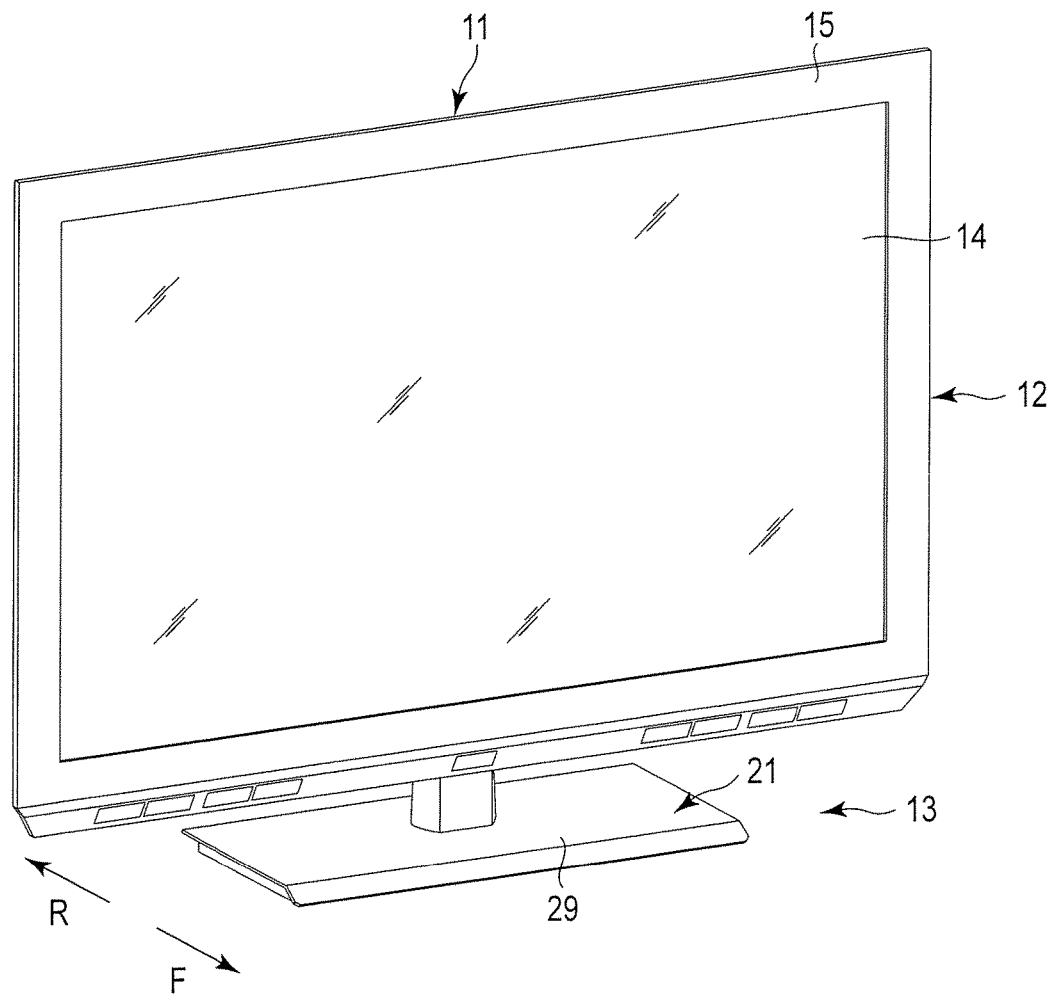
FIG. 1 is an exemplary perspective view of a television which is an example of an electronic apparatus according to a first embodiment.

An embodiment of a television which is an example of an electronic apparatus will be explained hereinafter with reference to FIG. 1 to FIG. 8. As illustrated in FIG. 1, the television according to the embodiment is a thin display which has a rectangular appearance. As illustrated in FIG. 1, a television 11 comprises a display module 12, and a stand 13 (television stand) which is an example of a support module that supports the display module 12. In FIG. 1, the right side in FIG. 1 is a front direction (indicated by an arrow F) of the television 11, and the left side in FIG. 1 is a rear direction (indicated by an arrow R) of the television 11.

The display module 12 includes a display panel 14, a control module (not shown) which is provided on a back surface of the display panel 14, and a case 15 which encloses the display panel 14 and the control module.

In the present embodiment, the display panel 14 is formed of, for example, a liquid crystal panel of a rectangular plate shape. The display panel 14 may be a display panel of other types, such as a plasma display panel and an organic EL device panel.

Figure 2:
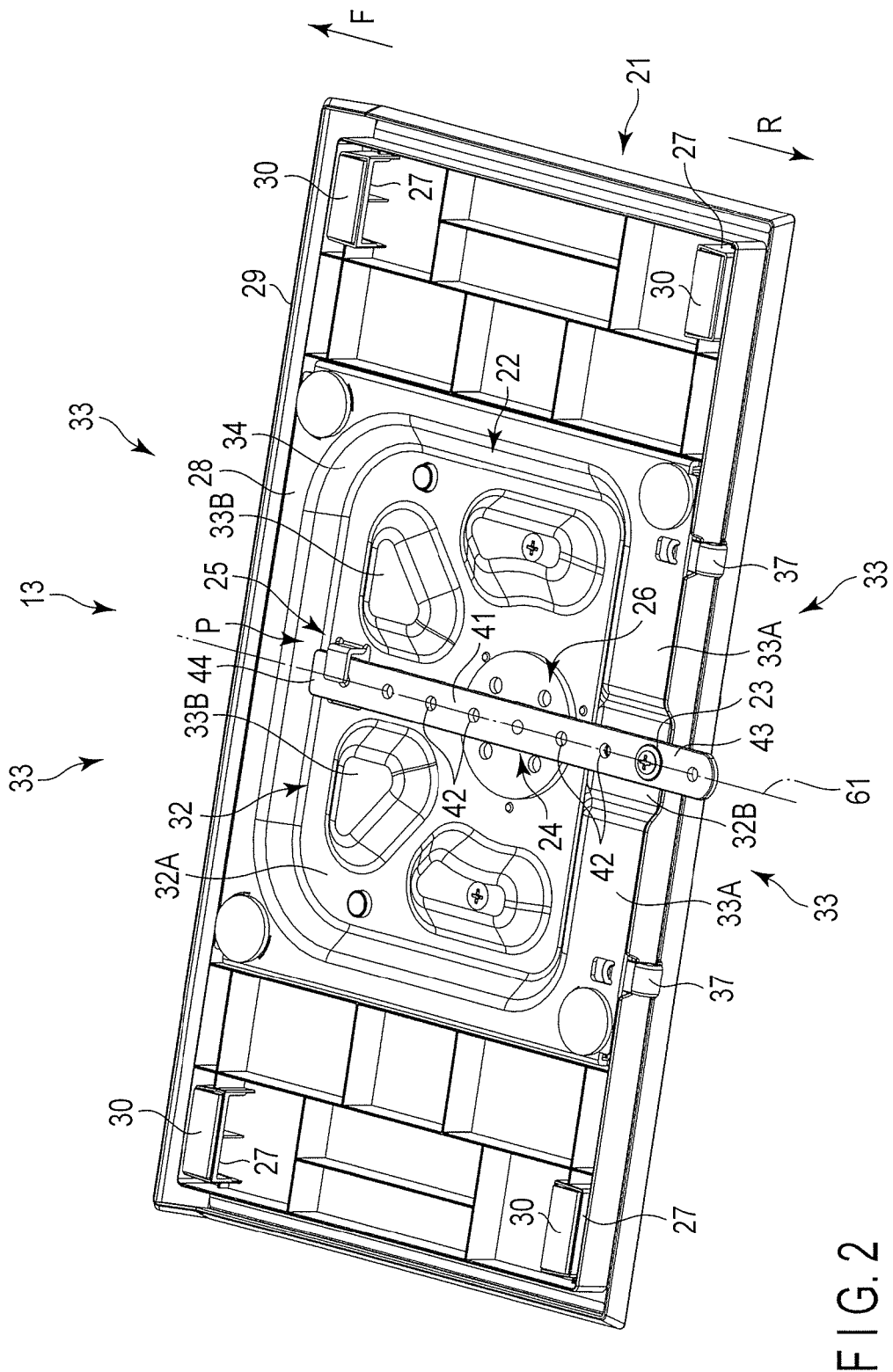
FIG. 2 is an exemplary perspective view of a stand of the television illustrated in FIG. 1, as viewed from below in a state where a band is in a first position.

As illustrated in FIG. 1 and FIG. 2, the stand 13 includes a main body 21 having a rectangular-plate shape, a bottom part 22 which is provided on a bottom surface of the main body 21, a screw 23 (rotation axis, attached part) which is attached to the bottom part 22, a band (rotator) 24 which is rotatable around the screw 23, a hook 25 which regulates a rotation direction of the band 24 and holds the band 24 in a first position P1, a swivel part 26 which rotatably supports the display module 12, and rectangular leg parts 27 which are provided in four corners of the main body 21. A rectangular nonskid part 30, which is formed of an elastic material such as rubber, is adhered to each of the leg parts 27. The leg parts 27 are formed as one unitary piece with the main body 21 (cover 29), by using a mold having a slide core.

Figure 4:
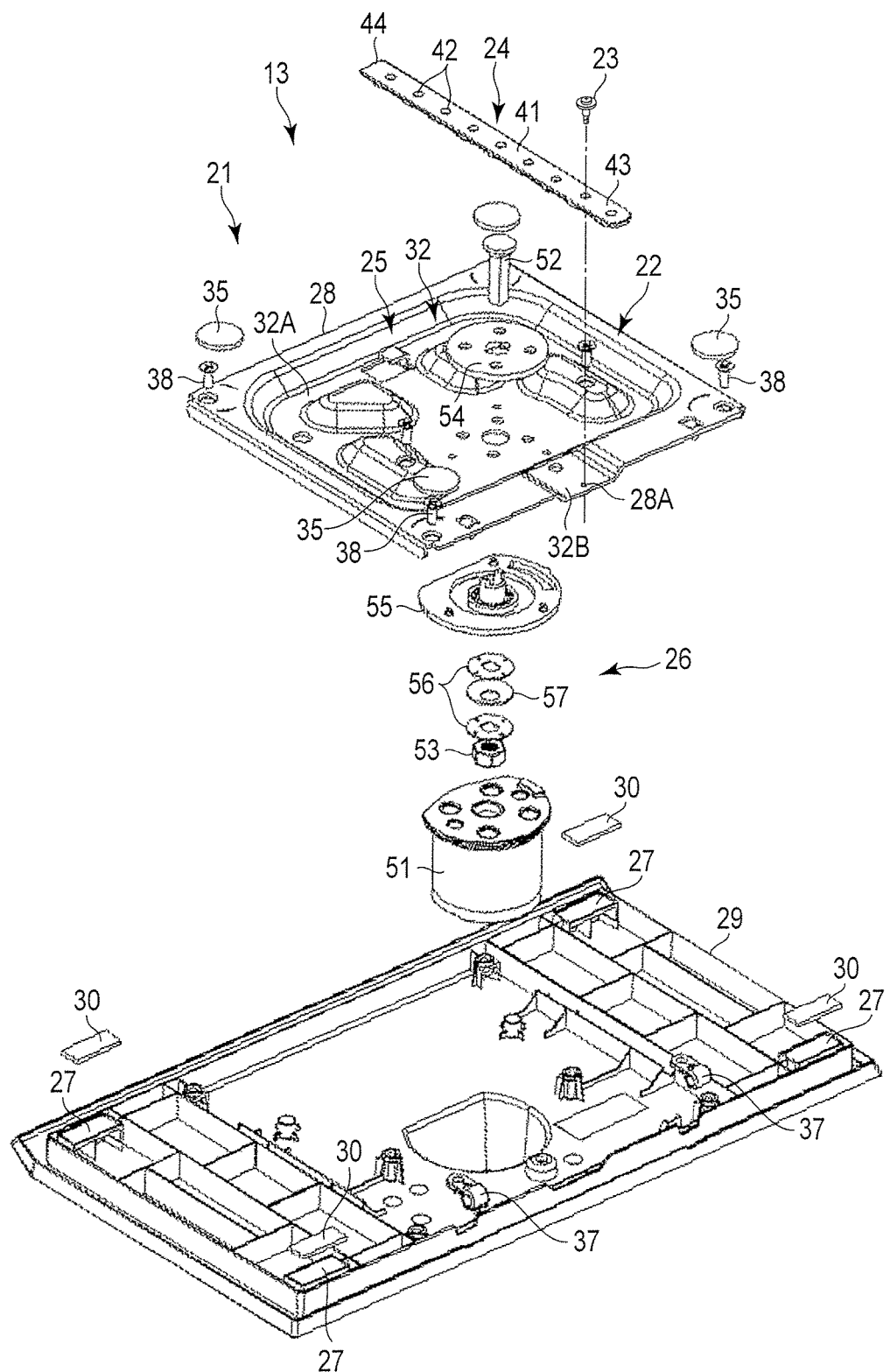
FIG. 4 is an exploded perspective view of the stand illustrated in FIG. 2.

As illustrated in FIG. 4, the screw 23 (rotation axis, attached part) is a so-called stepped screw which has a smooth shaft part, and can attach the band (rotator) 24 in a rotatable state to the main body 21.

Figure 3:
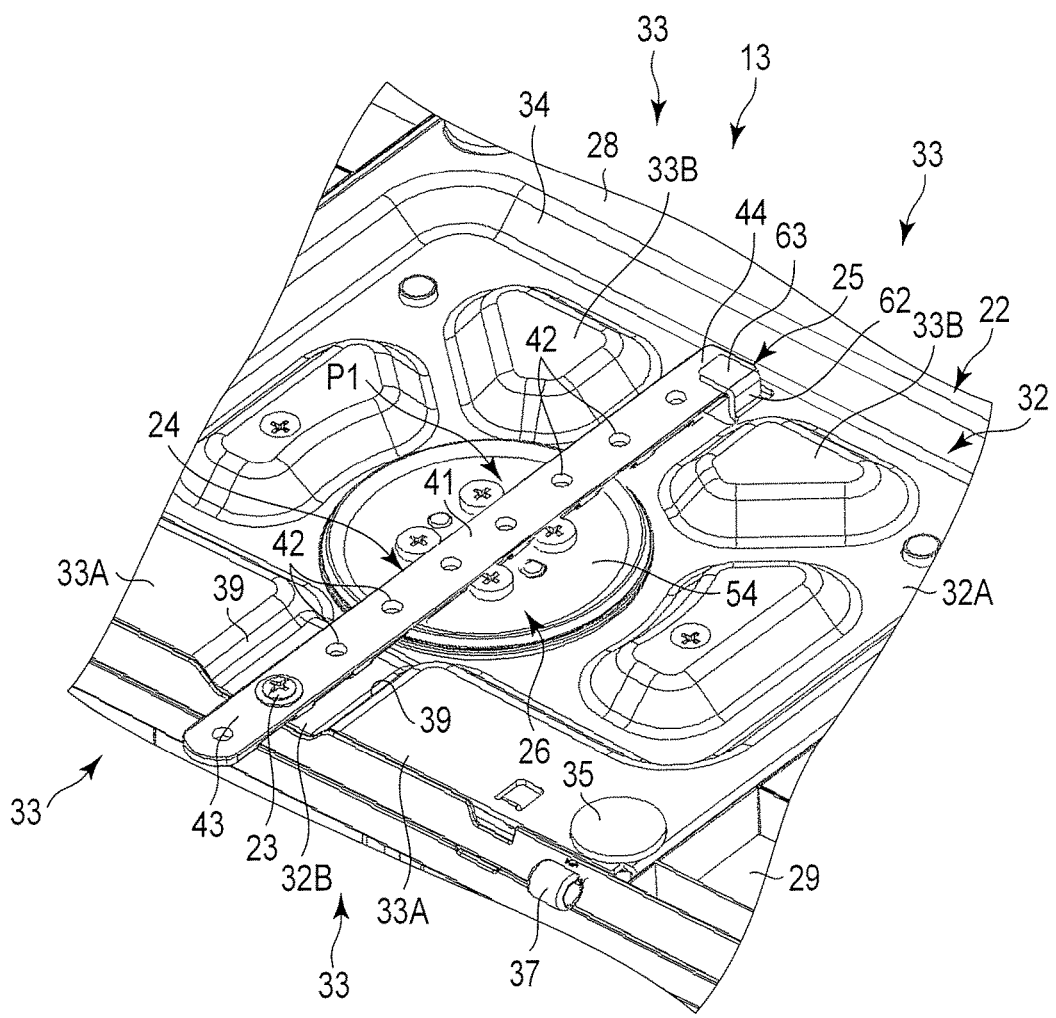
FIG. 3 is an exemplary enlarged perspective view of a part of the stand illustrated in FIG. 2.

The main body 21 includes a metal bottom plate 28 which defines the bottom part 22, and a cover 29 which is formed of synthetic resin and surrounds an above part and the whole periphery of the bottom plate 28. As illustrated in FIG. 3 and FIG. 4, the bottom part 22 includes a depressed part 32 which is depressed to be lower than a surrounding part, and a plurality of projecting parts 33 which connect to the depressed part 32 and project from the depressed part 32. The bottom plate 28 is a wall part which defines the bottom part 22, the depressed part 32, and the projecting parts 33, and is opposed to the display module 12.

A depressed and projecting shape including the depressed part 32 and the projecting parts 33 is formed by performing drawing or the like for the bottom plate 28. As illustrated in FIG. 2, the depressed part 32 includes a first depressed part 32A which is depressed with a larger depth, and a second depressed part 32B which connects to the first depressed part 32A and extends backward from the first depressed part 32A. The depth of the second depressed part 32B is smaller than that of the first depressed part 32A. An edge of the first depressed part 32A is defined by a drawing 34, and the hook 25 and the swivel part 26 are provided inside (in the first depressed part 32A) the drawing 34. The screw 23 (rotation axis, attached part) is provided in the second depressed part 32B. The band 24 which is in the first position P1 extends over the first depressed part 32A and the second depressed part 32B and contained in them.

As illustrated in FIG. 4, the stand 13 further includes fixing screws 38 to fix the bottom plate 28 to the main body 21, screens 35 for the fixing screws 38, and cylinder parts 37 through which a string runs for preventing the television from falling down. The screw 23 (rotation axis, attached part) is fastened in a hole 28A provided in the bottom plate 28, and can rotatably attach the band (rotator) 24 to the bottom part 22.

Figure 7:
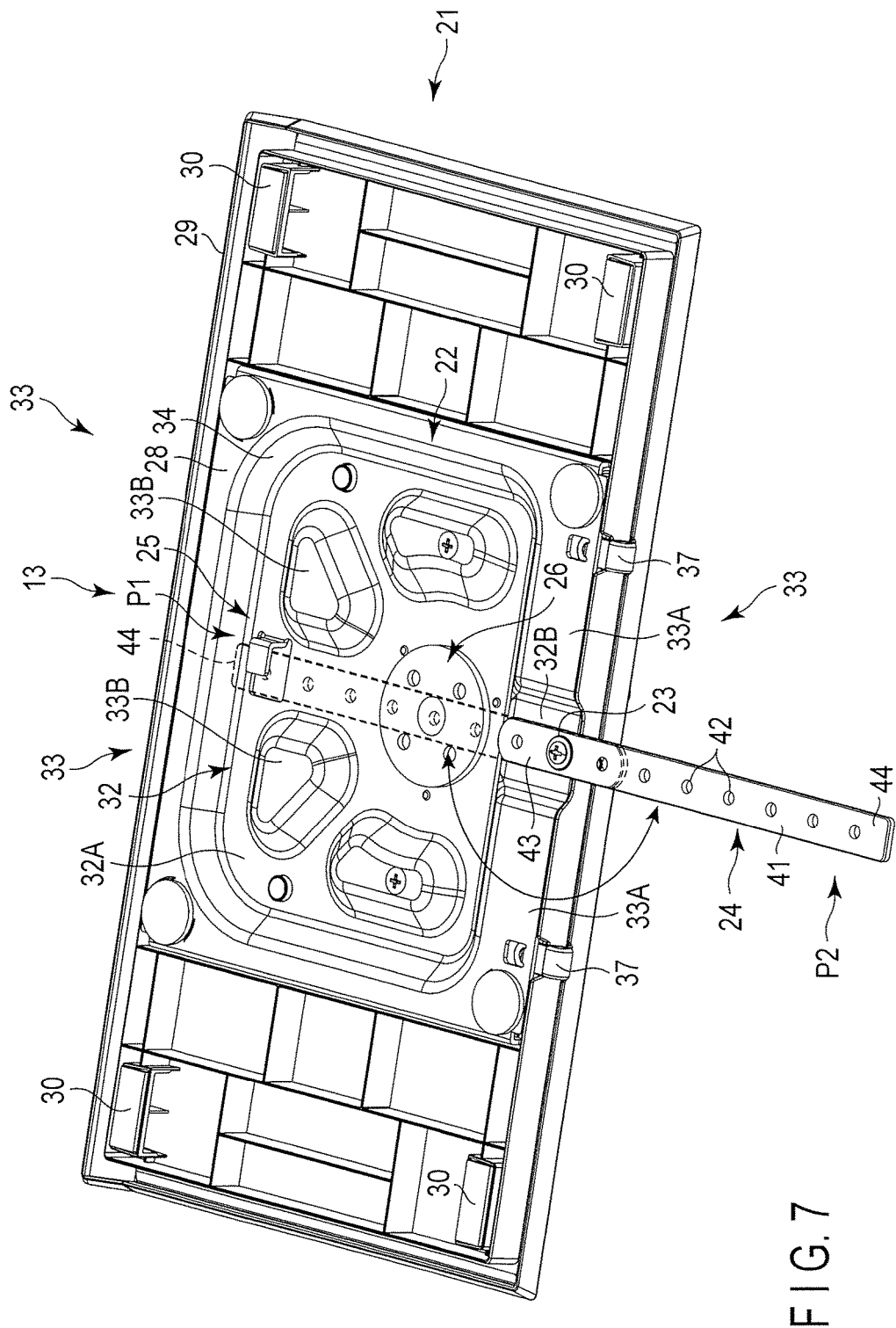
FIG. 7 is an exemplary perspective view illustrating a state where the band of the stand illustrated in FIG. 2 is moved to a second position.

The band (rotator) 24 fixes the main body 21 to a rack 36 such as a television rack, and can be used for preventing the television 11 from falling down. As illustrated in FIG. 2 and FIG. 3, the band 24 includes a belt-like band main body 41, a plurality of hole parts 42 (round holes) which are provided at regular intervals in the band main body 41, a first end part 43 which is attached to the main body 21 by the screw 23, and a second end part 44 which is located opposite to the first end part 43. The band 24 is formed of a plastic material such as polyamide (PA), and has flexibility and strength. The band 24 is attached to the main body 21, by making the screw 23 (rotation axis, attached part) run through one of the hole parts 42. The band 24 is rotatable around the screw 23 between a first position P1 (in which the second end part 44 is located between the support part (stand 13) and the opposed part (holding part 63)), in which the second end part 44 is superposed on the main body 21 as illustrated in FIG. 2, and a second position P2 (position which is different from the first position), in which the second end part 44 projects from the main body 21 as illustrated in FIG. 7. The second end part 44 of the band 24 which is in the first position P1 projects beyond the hook 25 as viewed from the screw 23 (rotation axis, attached part).

Figure 5:
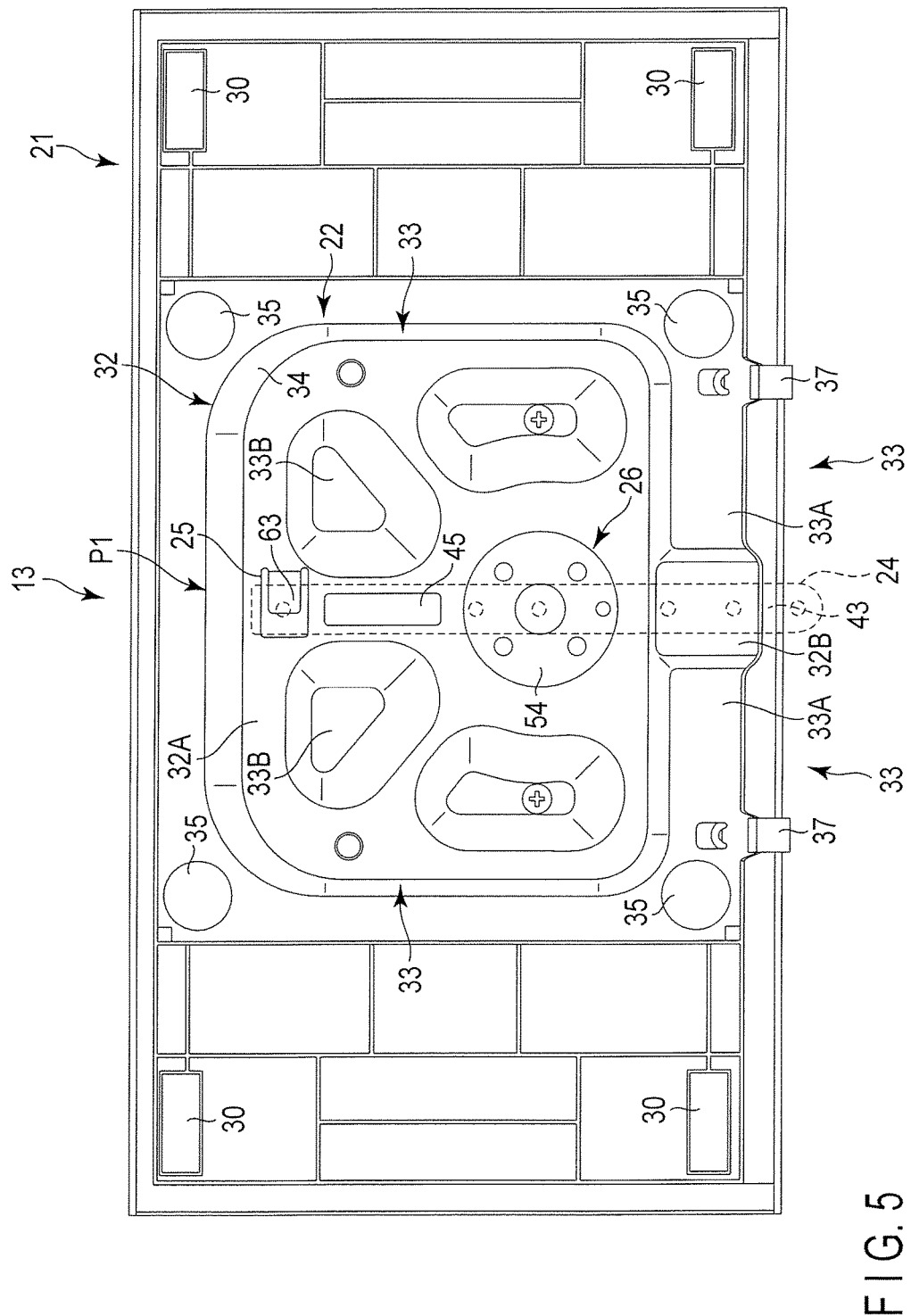
FIG. 5 is an exemplary bottom view of the stand illustrated in FIG. 2.

As illustrated in FIG. 5, the band 24 can function as a screen for a label 45 or the like which is bonded to the bottom part 22. For example, a manufacturing management number or a lot number is printed on the label 45, that is, the label 45 shows information which is unnecessary for the consumer or the user to view. Although the label 45 is disposed in a position under the band 24 in the first position P1 in the present embodiment, a logo with the company's or product's name or a reinforcing rib may be disposed in this position.

The swivel part 26 is provided between the main body 21 of the stand 13 and the display module 12, and can support the display module 12 such that the display module 12 is rotatable in a horizontal direction with respect to the main body 21. As illustrated in FIG. 4, the swivel part 26 includes a shaft part 51 which is fixed to a support frame of the display module 12, a bolt 52 which fixes the shaft part 51 to the bottom plate 28, a nut 53 which is fastened to the bolt 52, and a disk 54, a rotation plate 55, a washer 56, and a disk spring 57 which are interposed between the bolt 52 and the nut 53. The disk spring 57 applies a predetermined torque in rotation.

Figure 6:
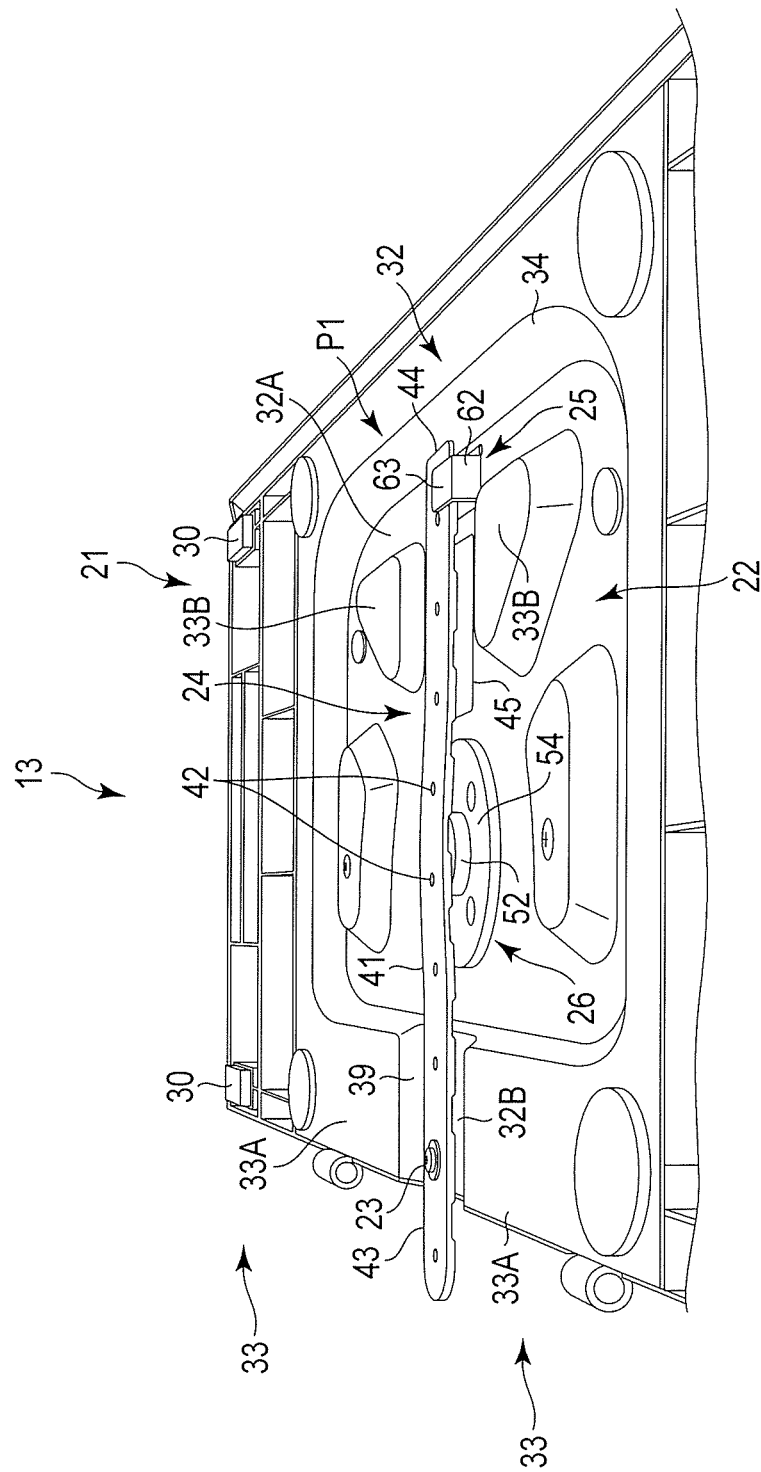
FIG. 6 is an exemplary enlarged perspective view of a part of the stand illustrated in FIG. 2.

As illustrated in FIG. 2 and the like, the swivel part 26 is disposed in a position which is closer to the rear side from the center part of the main body 21 of the stand 13. The swivel part 26 is located in an intermediate position between the screw 23 (rotation axis, attached part) and the hook 25. As illustrated in FIG. 6, the swivel part 26 projects from the bottom part 22 between the screw 23 and the hook 25, and can abut against the band 24 in the first position P1 and moderately bend the band 24. Thereby, the band 24 can be pushed against an inside part of a holding part 63 (opposed part (area, support part) which is opposed to at least part of the support part (stand 13)), and thereby the band 24 is prevented from falling out of the holding part 63 (a held part which is held between the holding part 63 and the stand 13) against the user's intention.

As illustrated in FIG. 2, the projecting parts 33 include first projecting parts 33A which are provided in the vicinity of the screw 23 (rotation axis, attached part), and second projecting parts 33B which are provided in the vicinity of the hook 25. The first projecting parts 33A are provided as a pair on both sides of a part located around the screw 23. The first projecting parts 33A gradually rise as they go from a line 61, which passes through the screw 23 (rotation axis, attached part) and the hook 25, toward a direction perpendicular to the line 61. As illustrated in FIG. 2 and FIG. 3, an angle of slopes 39, each of which extends from the second depressed part 32B to the first projecting part 33A, is smaller than an angle of a slope of the drawing 34. Thereby, the band 24 can be held in the first position P1 by a gentle slope.

The second projecting parts 33B are provided in the vicinity of the hook 25 and in front of the hook 25 as viewed from the screw 23. The second projecting parts 33B are provided as a pair on both sides of the band 24 in the first position P1. The second projecting parts 33B gradually rise as they go from the line 61 which passes through the screw 23 (rotation axis, attached part) and the hook 25 toward the direction perpendicular to the line 61. The second projecting parts 33B make the band 24 in the first position P1 easily held in the first position P1, which facilitates positioning of the band 24 when the band 24 is moved from the second position P2 to the first position P1. In addition, the drawing 34 and the second projecting parts 33B contribute to increase in strength of the bottom plate 28.

As illustrated in FIG. 2 and FIG. 3, the hook 25 is provided in the vicinity of the second end part 44 of the band 24 in the first position P1. The hook 25 has a hook shape in which a stopper part (control part) 62 is united with the holding part (opposed part) 63. In other words, the hook 25 projects from the bottom part 22 (bottom plate 28) and has an L shape. The hook 25 is provided in the vicinity of the second end part 44 of the band 24 in the first position P1.

The stopper part (control part) 62 projects from the bottom part 22 in a direction perpendicular to the bottom part 22, and can control a rotation direction of the band 24. Specifically, the stopper part 62 collides with the band 24 and stops rotation of the band 24 when the band 24 in the first position P1 rotates in a clockwise direction, and allows rotation of the band 24 when the band 24 in the first position P1 rotates in a counterclockwise direction. In other words, the stopper part (control part) 62 strikes on the band 24 (rotator) in the first position P1, and stops clockwise rotation of the band 24.

The arrangement of the stopper part 62 is only an example, and the stopper part 62 may be provided on a side opposite to the side of the present embodiment. In the case of adopting the arrangement of this modification, the stopper part 62 collides with the band 24 and stops rotation of the band 24 when the band 24 in the first position P1 rotates in the counterclockwise direction, and allows rotation of the band 24 when the band 24 in the first position P1 rotates in the clockwise direction.

The holding part (opposed part) 63 extends from a distal end of the stopper part 62 toward the band 24 in the first position P1 in a direction perpendicular to the stopper part 62. The length of the holding part 63 is at least half, and at most equal to, a width of the band 24. More preferably, the length of the holding part 63 is slightly larger than half of the width of the band 24. Thereby, it is possible to balance stability in holding the band 24 in the first position P1 with removability in removing the band 24 from the first position P1.

Operation of the band 24 of the stand 13 in the present embodiment will be explained hereinafter with reference to FIG. 7 and FIG. 8. When the band 24 is fixed to the rack 36, the band 24 is rotated counterclockwise around the screw 23 (rotation axis, attached part), and moved from the first position P1 to the second position P2, as illustrated in FIG. 7. In moving the band 24, the second end part 44 which projects beyond the hook 25 as viewed from the screw 23 (rotation axis, attached part) can be held by hand, and thus the band 24 can be easily rotated. After the band 24 is moved to the second position P2, the band 24 is held between a pair of the first projecting parts 33A, and thus the band 24 in the second position P2 is stable.

Figure 8:
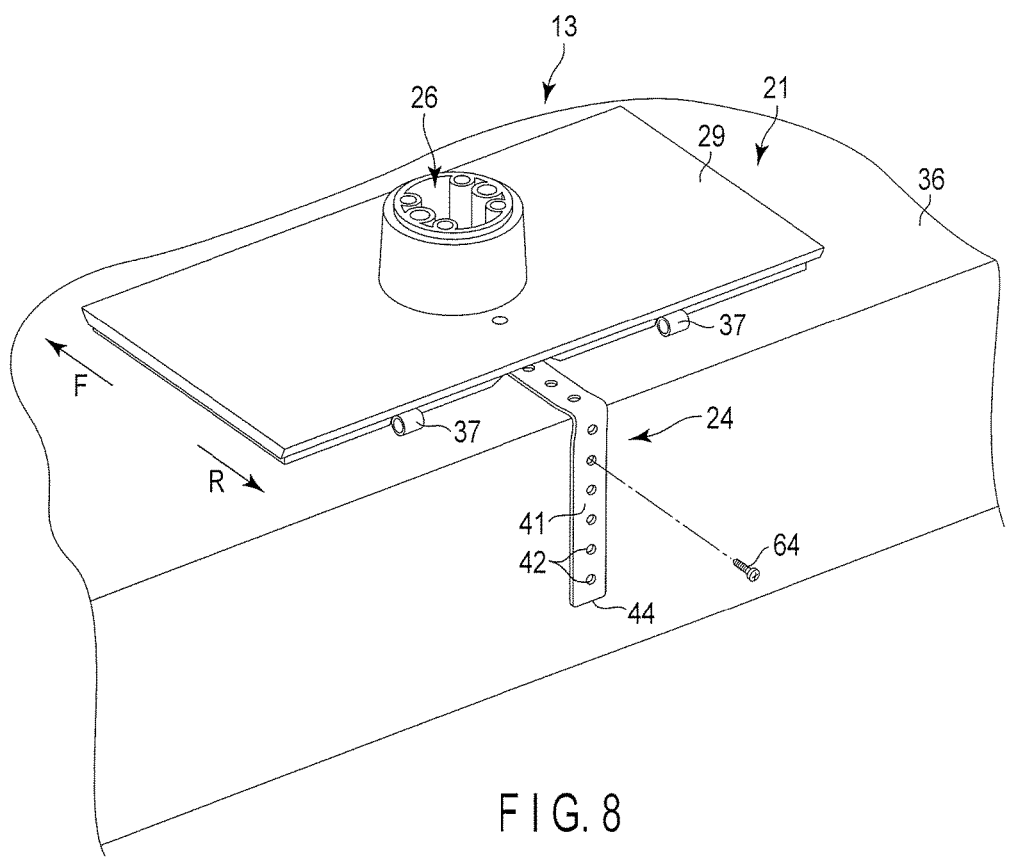
FIG. 8 is an exemplary perspective view illustrating a process of fixing the band of the stand illustrated in FIG. 7 to a rack.

Next, as illustrated in FIG. 8, the band 24 is taken to, for example, the back surface of the rack 36, and fixed to the rack by a second fixing screw 64. In addition, the display module 12 is attached to the stand 13 on the rack 36, and thereby establishment of the television 11, for which a fall-prevention measure has been taken, is finished.

According to the first embodiment, the television stand includes the main body 21, in which the bottom part 22 includes the attached part, the band 24 which includes the first end part 43 that is attached to the main body 21 through the attached part (screw 23), and the second end part 44 that is located opposite to the first end part 43, and which is rotatable around the attached part between the first position P1 where the second end part 44 is superposed on the main body 21 and the second position P2 where the second end part 44 projects from the main body 21, and a hook 25 which includes the stopper part 62 that strikes on the band 24 when the band 24 in the first position P1 rotates in one of a clockwise direction and a counterclockwise direction, and stops rotation of the band in the direction, and the holding part 63 that extends from the stopper part 62 in a direction perpendicular to the stopper part 62 and holds the band 24 in the first position P1.

According to the above structure, since the hook 25 includes the holding part 63, it is possible to prevent the band 24 from falling out of the first position P1 against the user's intention. In addition, since there is the stopper part 62, the position of the band 24 can be promptly determined when the band 24 is returned to the first position P1, and thus the stopper part 62 is convenient for the user. Further, as the stopper part 62 and the holding part 63 can be formed as one unitary piece by the hook 25 with a simple structure, the number of parts can be reduced. The hook 25 which has the structure as in the present embodiment can be easily formed by bending or drawing when the hook 25 is formed of metal, or by injection molding when the hook 25 is formed of resin, and thus the manufacturing cost can be reduced.

In addition, the hook 25 is provided in the vicinity of the second end part 44 of the band 24 in the first position P1. According to this structure, when the television 11 is moved, the second end 44 of the band 24 in the first position P1 does not flap, and the band 24 in moving is not caught by surrounding objects to damage the screw 23 (rotation axis, attached part) or the band 24.

The television stand 13 includes the swivel part 26 which supports the display module 12. The swivel part 26 is provided between the attached part (screw 23) and the hook 25, and bends the band 24 in the first position P1. According to this structure, the band 24 can be moderately pushed against the holding part 63, thereby a frictional force which acts between the holding part 63 and the band 24 increases, and it is possible to prevent the band 24 from falling out of the holding part 63 when it is not intended.

In addition, the second end part 44 of the band 24 in the first position P1 projects beyond the hook 25 as viewed from the attached part (screw 23). According to this structure, the user can easily hold the band 24, and can easily move the band 24 from the first position P1 to the second position P2 by holding the second end part 44. Therefore, it is convenient for the user that the second end part 44 projects from the holding part 63.

The bottom part 22 of the main body 21 is provided with the depressed part 32, and the depressed part 32 contains the attached part (screw 23), the band 24 in the first position P1, and the hook 25. This structure prevents the main body 21 from floating up and becoming unstable due to providing the attached part and the band 24 in the bottom part 22.

In addition, the main body 21 is provided with the projecting parts 33 which project from the depressed part 32. The projecting parts 33 gradually project from the line 61 which passes through the attached part (screw 23) and the hook 25 toward the direction perpendicular to the line 61. This structure makes it difficult for the band 24 to fall out of the hook 25. This structure can prevent the band 24 from moving from the first position P1 when it is not intended.

The projecting parts 33 are provided in the vicinity of the attached part (screw 23). According to this structure, for example, when the band 24 is in the second position P2, it is possible to prevent the band 24 from returning to the first position P1 against the user's intention. Further, the projecting parts 33 are provided in the vicinity of the hook 25 and in front of the hook 25 as viewed from the attached part (screw 23). This structure makes it difficult for the band 24 to fall out of the hook 25, and prevents the band 24 from moving from the first position P1 when it is not intended.

Figure 9:
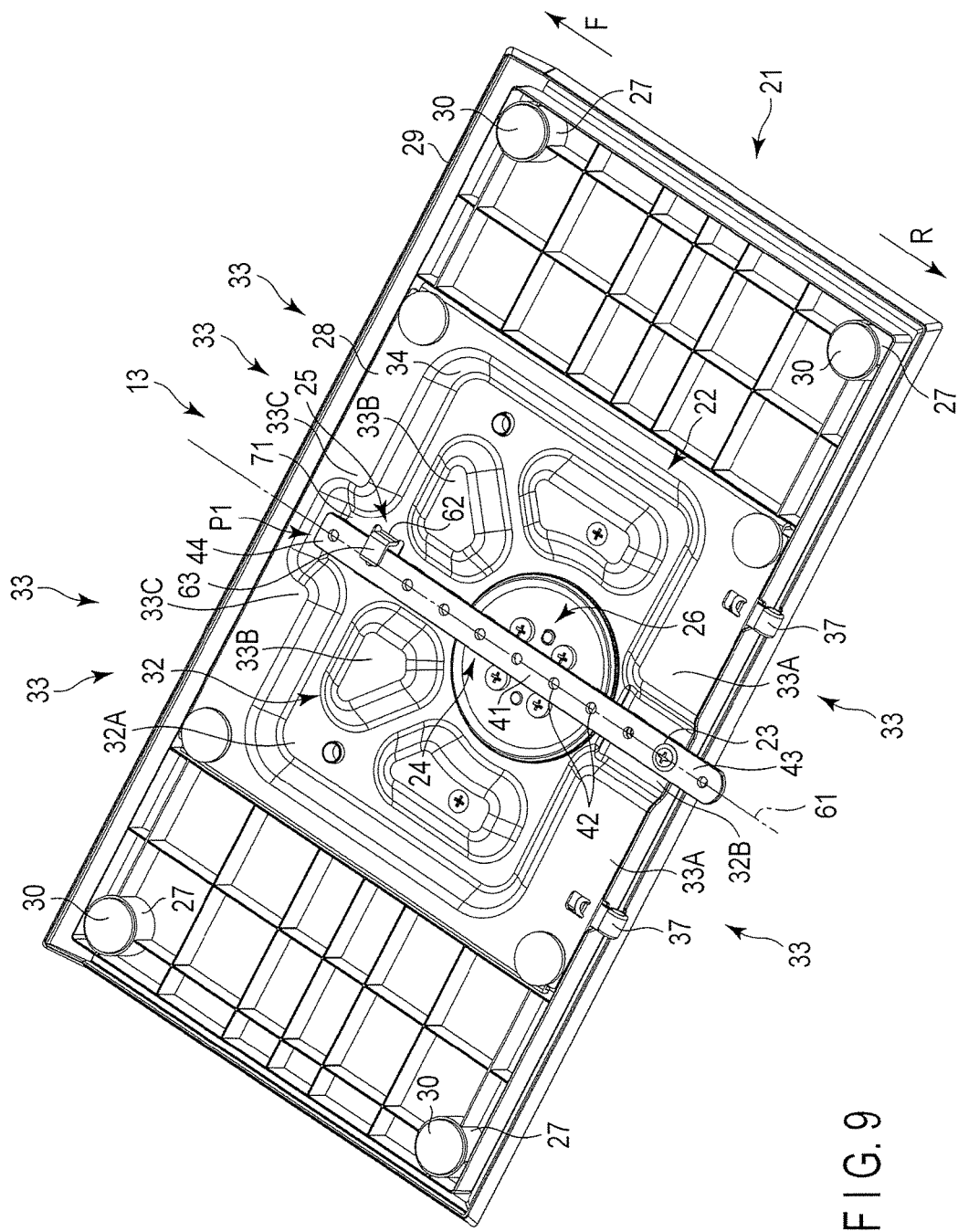
FIG. 9 is an exemplary perspective view of a stand of a television which is an example of an electronic apparatus according to a second embodiment, as viewed from below.

Next, a second embodiment of the electronic apparatus will be explained hereinafter with reference to FIG. 9. A television 11, which is an example of the electronic apparatus of the second embodiment, is different from the first embodiment in structures of the depressed part 32 and the projecting parts 33 and the length of the band (rotator) 24, but the same as the first embodiment in the other parts. Therefore, parts of the second embodiment which are different from the first embodiment will be mainly explained, and parts which are common to the first and the second embodiments are denoted by common reference numerals, and explanation thereof is omitted.

In the second embodiment, a band (rotator) 24 has a length larger than that of the first embodiment. To handle the band 24 having the larger length, a depressed part 32 is provided with an extension part 71 which projects to contain a second end part 44 of the band 24 in the first position P1. Further, in the present embodiment, there are third projecting parts 33C, in addition to first projecting parts 33A and second projecting parts 33B of the first embodiment. The third projecting parts 33C are provided in the vicinity of a hook 25, and beyond the hook 25 as viewed from a screw 23 (rotation axis, attached part). The third projecting parts 33C are provided as a pair on both sides of the second end part 44 of the band 24 in the first position P1, and gradually rise as they go from a line 61, which passes through the screw 23 (rotation axis, attached part) and the hook 25, toward a direction perpendicular to the line 61. Therefore, the present embodiment has improved performance to hold the band 24 in the first position P1, and more effectively prevents the band 24 from falling out of a holding part (opposed part) 63 when it is not intended.

Further, in the present embodiment, leg parts 27 have a circular shape. The leg parts 27 are provided with respective circular nonskid parts 30 which are formed of an elastic material such as rubber.

According to the second embodiment, the projecting parts 33 are provided in the vicinity of the hook 25, and beyond the hook 25 as viewed from the attached part (screw 23). This structure improves performance to hold the band 24 in the first position P1, and more effectively prevents the band 24 from moving from the first position P1 when it is not intended.

Next, a third embodiment of the electronic apparatus will be explained hereinafter with reference to FIG. 10. A television 11, which is an example of the electronic apparatus of the third embodiment, is different from the first embodiment in structure of the band (rotator) 24, but the same as the first embodiment in the other parts. Therefore, the part of the third embodiment which is different from the first embodiment will be mainly explained, and parts which are common to the first and the third embodiments are denoted by common reference numerals, and explanation thereof is omitted.

A band (rotator) 24 includes a belt-like band main body 41, a plurality of hole parts 42 (round holes) which are provided at regular intervals in the band main body 41, at least one long hole part 72 which is provided at an end part of the band main body 41, a first end part 43 which is attached to a main body 21 by a screw 23 (rotation axis, attached part), and a second end part 44 which is located at an end opposite to the first end part 43. The long hole part 72 extends along a longitudinal direction of the band 24. The band 24 is attached to the main body 21 by making the screw 23 (rotation axis, attached part) pass through the long hole part 72. The band 24 is rotatable around the screw 23 (rotation axis, attached part) between a first position P1 where the second end part 44 is superposed on the main body 21 and a second position P2 where the second end part 44 projects (goes) out of the main body 21.

In the third embodiment, operation performed until the band 24 is moved from the first position P1 to the second position P2 is the same as that of the first embodiment. However, in the third embodiment, it is possible to adjust a drawing length of the band 24 in the second position P2 through the long hole part 72, as illustrated in FIG. 10.

Generally, when the rack has a special shape, there are cases where the length of the band 24 is insufficient. According to the third embodiment, the drawing length of the band 24 can be adjusted, and thereby the band 24 can be fixed to a rack which has a special shape. This structure increases versatility of the band 24, and further improves convenience for the user.

Figure 11:
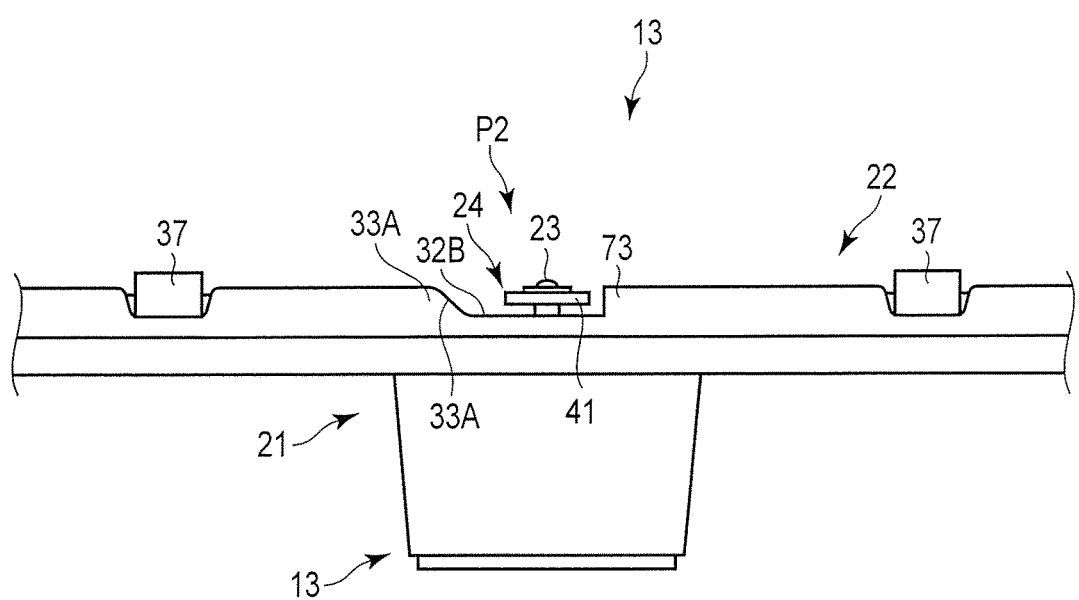
FIG. 11 is an exemplary perspective view of a stand of a television which is an example of an electronic apparatus according to a fourth embodiment, as viewed from below.

Next, a fourth embodiment of the electronic apparatus will be explained hereinafter with reference to FIG. 11. A television 11, which is an example of the electronic apparatus of the fourth embodiment, is different from the first embodiment in that the television 11 includes a second stopper part 73, but the same as the first embodiment in the other parts. Therefore, the part of the fourth embodiment which is different from the first embodiment will be mainly explained, and parts which are common to the first and the fourth embodiments are denoted by common reference numerals, and explanation thereof is omitted.

In the fourth embodiment, a second stopper part 73 is provided in the vicinity of a screw 23 (rotation axis, attached part). Specifically, the fourth embodiment is provided with the second stopper part 73, instead of the first projecting part 33A on the right side in FIG. 2. The second stopper part 73 has, for example, a stepped shape rising from a second depressed part 32B, and prevents a band (rotator) 24 in the second position P2 from rotating in a counterclockwise direction. The second stopper part 73 projects from a bottom part 22 (wall part) to strike on the band 24 when the band (rotator) 24 in the second position P2 rotates in the counterclockwise direction, and allows rotation of the band 24 when the band 24 in the second position P2 rotates in a clockwise direction. In other words, the second stopper part 73 strikes on the band 24 (rotator) in the second position P2, and can stop counterclockwise rotation of the band 24.

The shape of the second stopper part 73 is only an example. For example, the second stopper part 73 may have a pin shape or L shape such as a hook to control the rotation direction of the band.

The fourth embodiment is particularly useful in the case of limiting the rotation direction of the band 24 in the second position P2, to prevent the band 24 from rotating in a direction in which the band 24 cannot be engaged with a hook 25.

The electronic apparatus is not limited to the above embodiments, but can be realized with modified constituent elements within a range not departing from the gist. Various inventions can be made by proper combinations of constituent elements disclosed in the above embodiments. For example, some of the constituent elements in the embodiment may be removed. In addition, constituent elements of different embodiments may be used in combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A television stand comprising:
a main body;
a band including
(i) a first end part that comprises an attached part attached to the main body; and
(ii) a second end part located opposite to the first end part,
the band being rotatable around the attached part between a first position where the second end part is superposed on the main body and a second position where the second end part projects outside of the main body, the first end part including a tip portion which projects outside of the main body when the band is held in the first position, and the second end part being adapted for placement into a fixed state subsequent to the band being placed in the second position;

a hook being provided in the main body and positioned closer to the second end part of the band than the first end part when the band is in the first position, the hook including a holding part that holds the band in the first position; and a stopper part that is configured to (i) strike the band when the band rotates into the first position, and (ii) stop rotation of the band upon the strike of the band; and a projection being provided at the main body and located between the attached part and the hook, the projection abutting against the band and bending the band such that the second end part of the band is pushed against the holding part of the hook when the band is rotated to the first position, wherein the holding part is shorter than the band in a width direction of the band, wherein a bottom part of the main body is provided with a depressed part, the depressed part including the attached part when the band is in the first position, and wherein the main body is provided with a plurality of projecting parts which projects from the depressed part, the plurality of projecting parts gradually rising from a line and passing through the attached part and the hook toward a direction perpendicular to the line.

2. The television stand of claim 1, wherein the plurality of projecting parts is provided laterally from close to the attached part.

3. The television stand of claim 1, wherein the plurality of projecting parts is provided laterally from the hook and in front of the hook as viewed from the attached part.

4. The television stand of claim 1, wherein the band is provided with a long hole, the long hole extends in a longitudinal direction of the band, the attached part includes a screw attached to the bottom part of the main body, and the screw is made to pass through the long hole.

5. The television stand of claim 1, wherein the band further serves as a screen of a label which is bonded to the bottom part.

6. The television stand of claim 1, further comprising:

a second stopper part which projects from the bottom part, strikes on the band that is in the second position when the band in the second position rotates in the other of the clockwise direction and the counterclockwise direction, and stops rotation of the band in the other direction.

7. The television stand of claim 1 wherein the main body is configured to support a display panel elevated over a surface of a television support element.

8. The television stand of claim 7, wherein the band, when placed in the second position, is placed into the fixed state by affixing the second end part of the band to the television support element to prevent the display panel from falling.

9. The television stand of claim 8, wherein the television support element is a television rack.

10. The television stand of claim 8, wherein the band is placed into the fixed state by affixing the second end part of the band to the television support element.

* * * * *